(12) United States Patent
Leppänen et al.

(10) Patent No.: US 7,706,997 B2
(45) Date of Patent: Apr. 27, 2010

(54) METHOD AND DEVICE FOR COMPENSATING TEMPERATURE DEPENDENCIES

(75) Inventors: Jukka Leppänen, Luhtajoki (FI); Arto Harju, Helsinki (FI); Risto Heikkinen, Vantaa (FI)

(73) Assignee: Vaisala Oyj, Vantaa (FI)

( * ) Notice: Subject to any disclaimer, the term of this patent is extended or adjusted under 35 U.S.C. 154(b) by 82 days.

(21) Appl. No.: 12/068,718

(22) Filed: Feb. 11, 2008

(65) Prior Publication Data

US 2008/0208503 A1 Aug. 28, 2008

(30) Foreign Application Priority Data

Feb. 12, 2007 (FI) .................................. 20075096

(51) Int. Cl.
*G01K 15/00* (2006.01)
*G01N 25/00* (2006.01)
*G01K 3/00* (2006.01)

(52) U.S. Cl. .................. 702/99; 73/61.46; 374/101

(58) Field of Classification Search ............ 702/99, 702/100, 127, 33, 50, 52, 81, 84–85, 104–105, 702/130–131, 182–183; 324/664, 600–601, 324/634, 640, 643, 658, 669–670, 684–686, 324/720–721; 73/1.01, 1.02, 1.06, 23.2, 73/23.21, 23.25, 23.26, 23.38, 61.43, 61.46, 73/73–74; 374/3, 54, 100–102, E3.001, 43
See application file for complete search history.

(56) References Cited

U.S. PATENT DOCUMENTS

| | | | | | |
|---|---|---|---|---|---|
| 2,807,956 | A | * | 10/1957 | Doble | ................. 73/61.43 |
| 4,891,969 | A | * | 1/1990 | Wayland et al. | ............ 73/61.44 |
| 4,916,940 | A | | 4/1990 | Mougne | |
| 5,330,268 | A | * | 7/1994 | Klein et al. | .................. 374/54 |
| 5,614,830 | A | | 3/1997 | Dickert et al. | |
| 2004/0154384 | A1 | * | 8/2004 | Leppanen et al. | .......... 73/61.46 |

FOREIGN PATENT DOCUMENTS

FI   20011040   11/2002

OTHER PUBLICATIONS

Fofana et al., "Retofilling Conditions of High-Voltage Transformers", Electrical Insulation Magazine, Mar./Apr. 2001, vol. 17, No. 2; pp. 17-30.

* cited by examiner

*Primary Examiner*—Michael P. Nghiem
*Assistant Examiner*—Toan M Le
(74) *Attorney, Agent, or Firm*—Birch, Stewart, Kolasch & Birch, LLP

(57) ABSTRACT

A method for measuring the temperature dependency of a sensor element for a variable, the value of which varies with the temperature, for any liquid. The method includes the steps of changing the temperature of the liquid over time, simultaneously collecting the data produced by the sensor element, and thereafter using the data produced by the sensor element at the different temperatures to determine coefficients for compensation algorithms of the temperature dependencies of the sensor element, thus producing a correlation between the change in temperature and the other measured variables.

22 Claims, 8 Drawing Sheets

METHOD AND DEVICE FOR COMPENSATING TEMPERATURE DEPENDENCIES

BACKGROUND OF THE INVENTION

1. Field of the Invention

The present invention concerns a method for determining the coefficients of the compensation algorithms of the temperature dependencies of sensors during the installation of an indicator.

2. Description of Background Art

In humidity measurements and in calibrations, temperatures of probes and the measuring environment play a large role. For example, even a small difference in the temperatures between the environment and the probe may cause an error, caused by, e.g., water condensing on the sensor surface.

Temperature dependencies of sensors depend on the liquid to be measured. For example the behaviour of an aqueous solution is much different from the behaviour of an oil-based liquid. The present invention provides a new method for measuring the temperature dependency of a sensor for any chosen variable for any liquid while gathering the data produced by the sensor.

For example, since the temperature dependencies of the relative humidity and the dielectric constant are required for the calculations of oil quality measurements, the equation can be significantly improved when coefficients specific for these applications can be used. Further, the temperature compensation of the relative humidity makes it possible to determine the water contents using an oil quality sensor.

SUMMARY AND OBJECTS OF THE INVENTION

The present invention concerns a method for measuring the temperature dependency of a sensor for a variable, the value of which varies with the temperature, for any liquid while gathering the data produced by the sensor element, in which method the temperature of the liquid is changed over time.

The method is characterized by changing the temperature of the liquid over time, simultaneously collecting the data produced by the sensor element simultaneously with the changing of the temperature, and using the data produced by the sensor element at the different temperatures to determine coefficients for compensation algorithms of the temperature dependencies of the sensor element, thus producing a correlation between the change in temperature and the other measured variables.

Since the temperature dependencies of sensors depend also on the liquid to be measured, the method of the present invention makes it possible, among others, to determine individual coefficients for precisely the application the measurement is being installed in.

The advantages of the present invention include that a value not depending on the temperature, indicating the water content, can be calculated from the relative humidity (aw) using temperature compensation. If the water content (ppm) is known at a particular moment, the above mentioned value can be changed into water content, whereby the ppm calculations can be included in the indicator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention concerns a method, using which the coefficients of the compensation algorithms of the temperature dependencies of sensors can be determined during the installation of indicators.

Figure 1A:
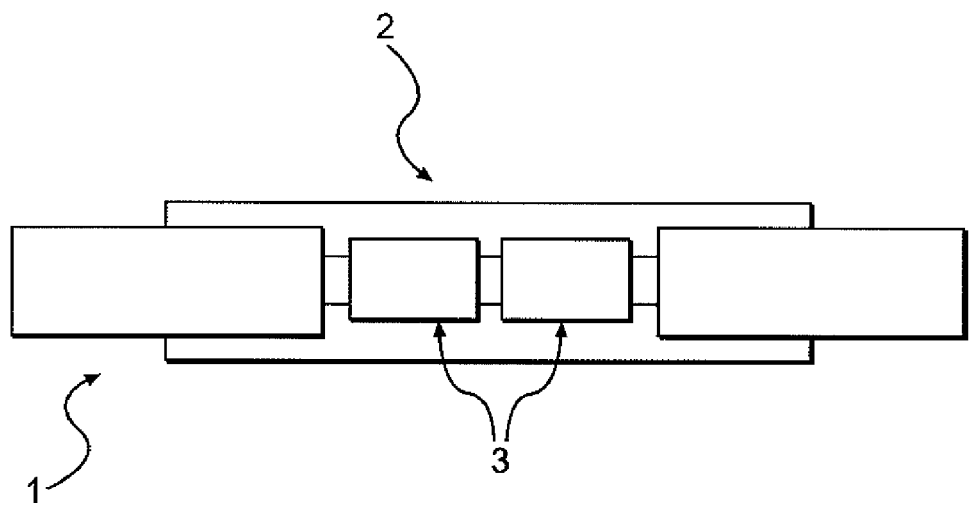
FIGS. 1a and 1b show patterns of measuring setups used in the present invention.
Figure 1B:
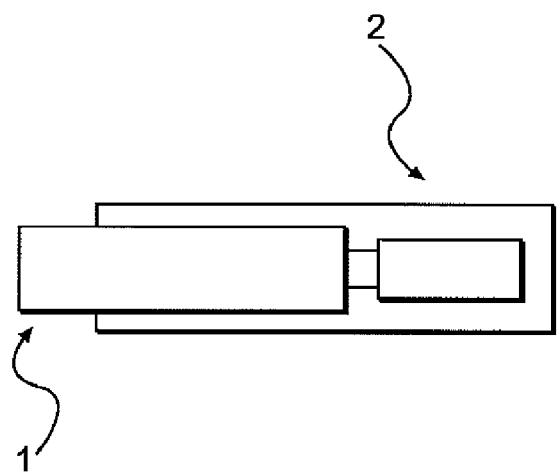

The device suited for said method contains at least the following parts (FIG. 1):

1 measuring probe
2 liquid container

More specifically, the device comprises the following parts:

3 sensor for a variable
4 means for changing the temperature
5 temperature sensor
6 means for collecting data
7 means for calculating necessary calibration coefficients According to typical embodiments of the present invention, the device further comprises the following details (FIGS. 5 and 6):

8 capacitor
9 aw-sensor
10 base of probe
11 calibration container
12 ball valve
13 mounting construction
14' press handle
15 ball valve handle 16 groove
17 clasp nut
18 filter The sensors and the means for changing temperature of the device are preferably mounted on at least one measuring probe 1, onto which a liquid container 2 is mounted (FIG. 1).

The temperature dependencies of the relative humidity (aw), the dielectric constant or any measurable variable as well as the temperature dependency caused to the above mentioned variables by at least one sensor element 3 may be measured by changing the temperature of a liquid taken from a system, such as a liquid container 2, using any means for changing the temperature 4, and by simultaneously collecting the data produced by the at least one sensor element 3 using any means for collecting data 6. Thus, a correlation is obtained between the change in temperature and the other measured variables by calculating using any means for calculating necessary calibration coefficients 7.

The heating can be performed using a temperature measurement resistor or the heating/cooling can be done using a separate heating/cooling element. The separate heating/cooling element may be mounted onto the measuring probe 1 or into the casing of the liquid container 2.

Figure 4:
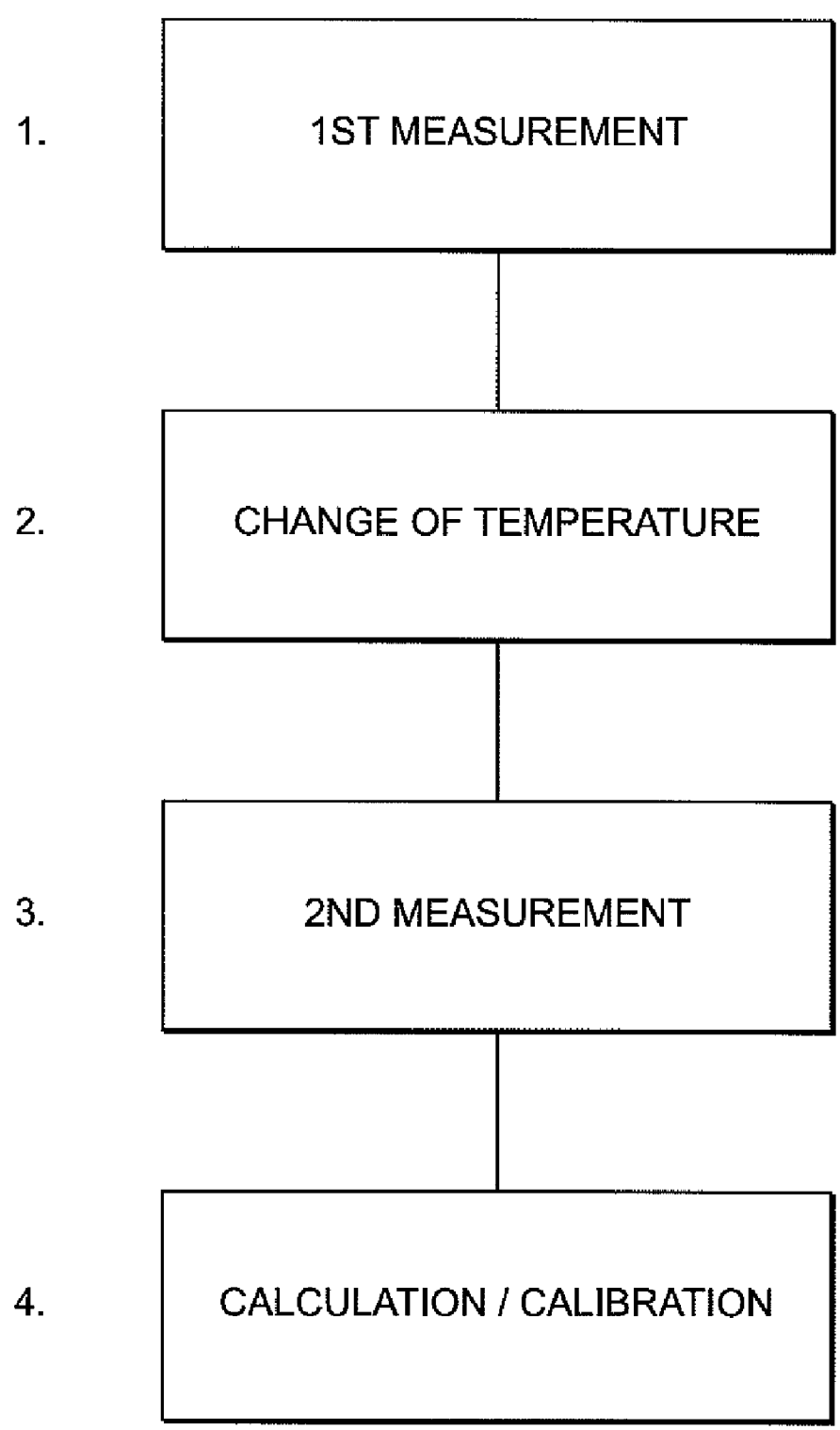
FIG. 4 is a scheme showing the steps required in the method of the present invention, i.e. a $1^{st}$ measurement, a change in temperature, a $2^{nd}$ measurement and a calculation/calibration step.

The temperature dependencies are determined as in FIG. 4 by performing initial measurements for at least one variable, changing the temperature, once again performing the measurements for the at least one variable and finally performing the required calculations/calibrations. Optionally, further measurement steps may be performed.

According to one embodiment of the present invention, the measured variable is the relative humidity (aw). A field calibration method is applied in these measurements. The relative humidity of a sample can be presented as a temperature dependent variable.

Temperature dependencies can be presented as any function f(T), such as:

$$aw = f(T) \quad (1)$$

Figure 3A:
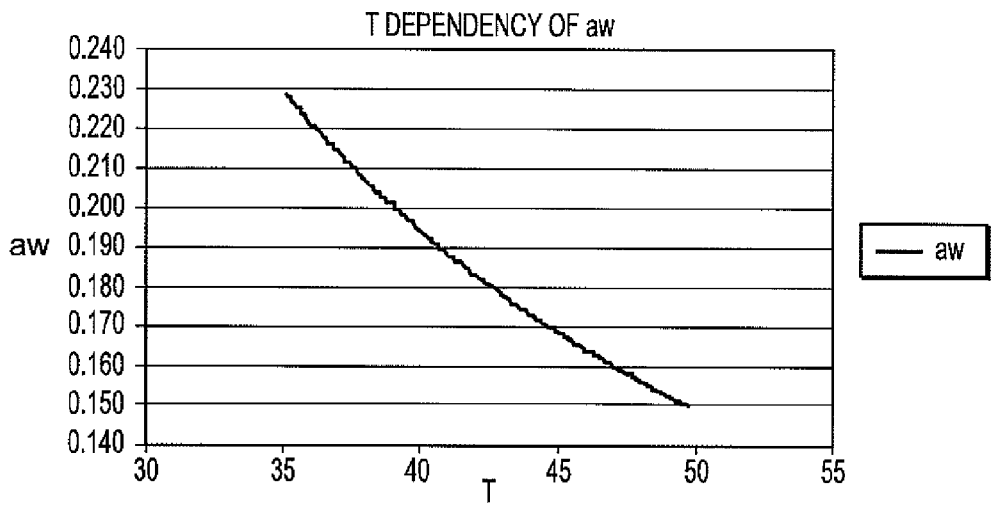
In FIG. 3a the relative humidity is shown as a function of the temperature, while the same is shown in FIG. 3b for different water contents.

In the present embodiment, the following equation is used:

$$aw = \exp(a/T + b) \quad (2)$$

wherein aw is the relative humidity and T is the temperature, while a and b are constants. An example of the measured temperature dependency of the relative humidity of a liquid is shown in FIG. 3a. The constants a and b can be derived for example from a graph, such as the one in FIG. 3a, whereby a is calculated from the slope of the graph and b is the value of the relative humidity (aw) when T=0.

Preferably, the sensors 3 of the measured variables, the liquid surrounding them and the temperature sensor 5 are substantially at the same temperature when the measuring points are chosen.

Using the above equation (1), a ratio can be determined, using which different water contents can be proportioned with different temperatures, whereby a function of the relative humidity at a certain temperature, aw(Tconst), is obtained, which function only depends on the water content. The used equation can thus be:

$$aw(T^1) = f(T^1) * [aw(T^2)/f(T^2)] \quad (3)$$

or, more specifically:

$$aw(T^1) = \exp(a/T^1 + b) * [aw(T^2)/\exp(a/T^2 + b)] \quad (4)$$

wherein aw is the relative humidity, $T^2$ is a given temperature, which is different from $T^1$ and for which the value for the relative humidity is known, and a and b are constants derived from a graph presenting the relative humidity as a function of the temperature, whereby a is derived from the slope of the graph, whereas b is the value of aw when T=0, which equation only depends on the water content of the liquid.

Figure 3B:
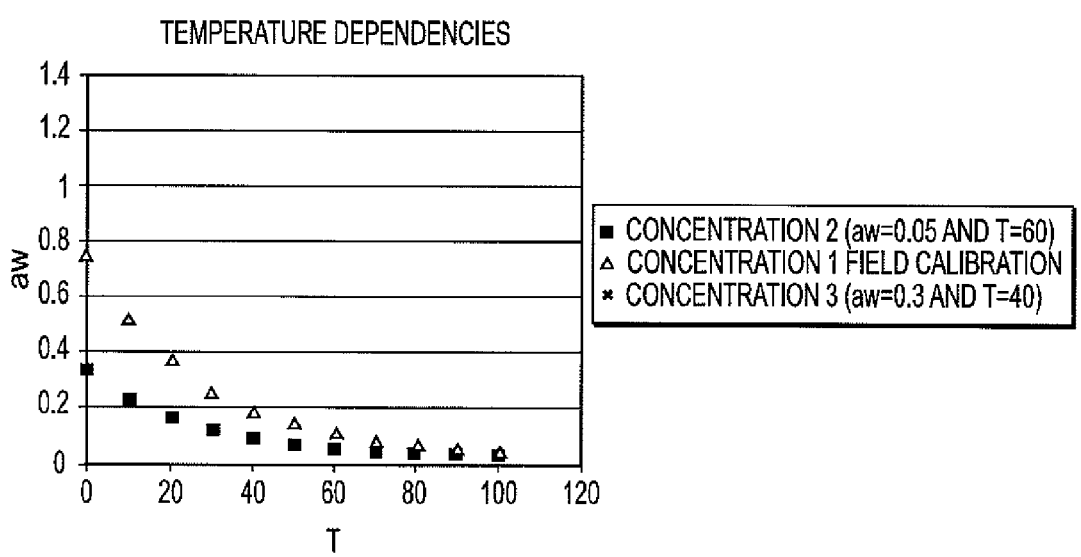
FIG. 3 shows graphic presentations of the temperature dependencies of the relative humidity (aw) and of the dielectric constant (C).
In FIG. 3c the dielectric constant is shown as a function of the temperature.

Using the above described field calibration method a value describing the temperature behaviour of a liquid can be calculated. In FIG. 3b, the temperature dependency of the relative humidity of a liquid at different water contents is graphically presented.

Further, when knowing the water content at a certain relative humidity and temperature, the water content of an unknown sample can be calculated, as in Example 3. It is assumed that the water content of the liquid does not change significantly during the temperature change.

Further, in the method of the present invention, the capacity of the heating/cooling, the volume of the liquid and the heat conduction are optimized so that the changes in temperature are caused in a reasonable time considering the installation of the measuring device.

According to another embodiment of the present invention, the method of the invention is applied for triple sensor measurements of a liquid. A field calibration method is applied in these measurements. The measured variables are the relative humidity, as in the previous embodiment, the dielectric constant and the temperature.

The relative humidity at a constant temperature, aw(Tconst), is determined using equation (2), while the temperature dependency of the dielectric sensor is determined using a similar field calibration method as above.

As above, temperature dependencies can be presented as any function f(T), such as:

$$Ceps = f(T) \quad (5)$$

Figure 3C:
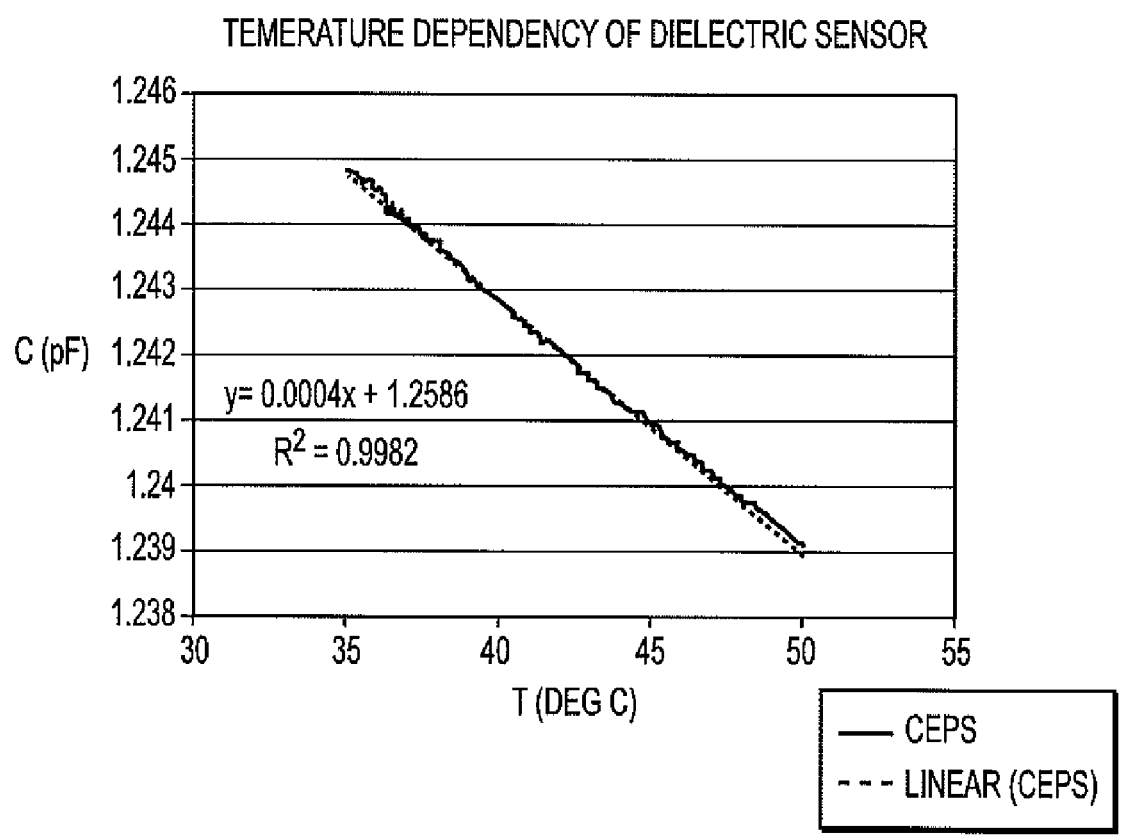

In the present embodiment, the following equation is used:

$$Ceps = a*T + Ceps_0 \quad (6)$$

wherein T is the temperature, Ceps is the dielectric constant, $Ceps_0$ is the value for the dielectric constant at T=0 and a is a constant derived from the slope of a graph presenting the dielectric constant as a function of the temperature. An example of the measured temperature dependency of the dielectric constant of a liquid is shown in FIG. 3c.

Figure 5:
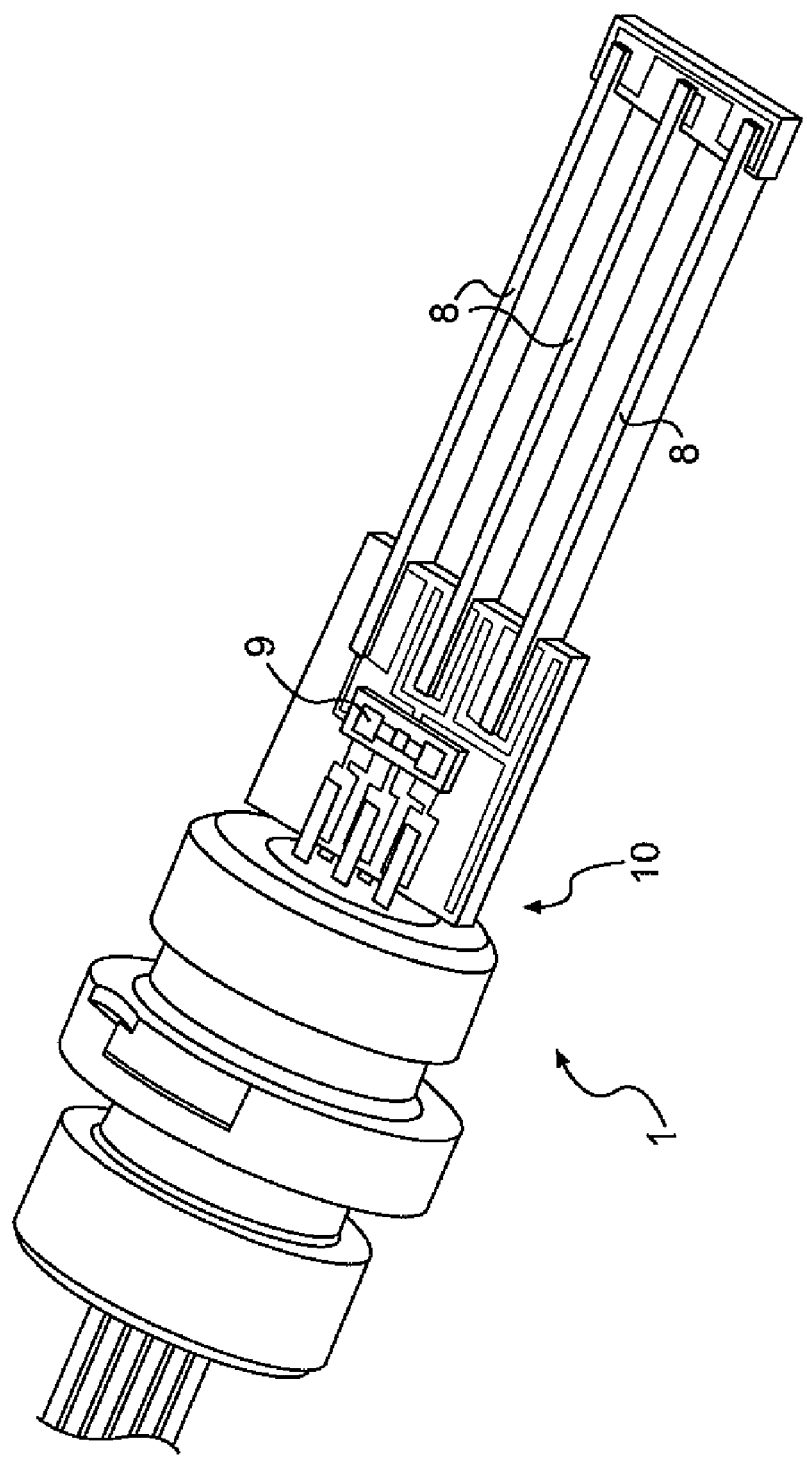
FIG. 5 is a drawing of a probe used in a typical embodiment of the present invention.

As shown in FIG. 5, a probe 1, used for the measurements of this embodiment, typically comprises a capacitor 8, formed by electrodes, for measuring the dielectric constant, an aw-sensor 9 positioned at the base 10 of the probe 1. The probe 1 may also contain means for changing the temperature 4 as well as a temperature sensor 5 (not shown in FIG. 5).

Equation (6) can also be presented in the following form, thus giving the dielectric constant at a given temperature, Tconst:

$$Ceps(Tconst) = Ceps(T) - a*(T - Tconst) \quad (7)$$

For this embodiment, a value for Ceps is determined, which value depends on neither the temperature nor the water content. Thus, equation (4) is changed into the following form, showing a correlation function, F(aw(Tconst)), for the variables:

$$Ceps(Tconst, aw=0) = Ceps(Tconst) - F(aw(Tconst)) \quad (8)$$

or, more generally:

$$Ceps(Tconst, aw=0) = f(Tconst) \quad (9)$$

When the correlation is linear, a proportionality factor (a) is obtained, which can be calculated from the slope of a line, such as the one of the graph of FIG. 3c. Thus, the equation takes the following form:

$$\text{Ceps}(T\text{const}, aw=0) = \text{Ceps}(T\text{const}) - a*aw(T\text{const}) \quad (10)$$

wherein aw is the relative humidity, Ceps is the dielectric constant, Tconst is the measured temperature at a given point and a is a proportionality factor derived from the slope of a graph presenting the dielectric constant as a function of the temperature.

Since the changes in the dielectric constant take place at a slow rate, the factors F(aw(Tconst)) can be determined using self calibration after the installation of the device or they can be determined using a field calibration device at two or more water contents.

Figure 6A:
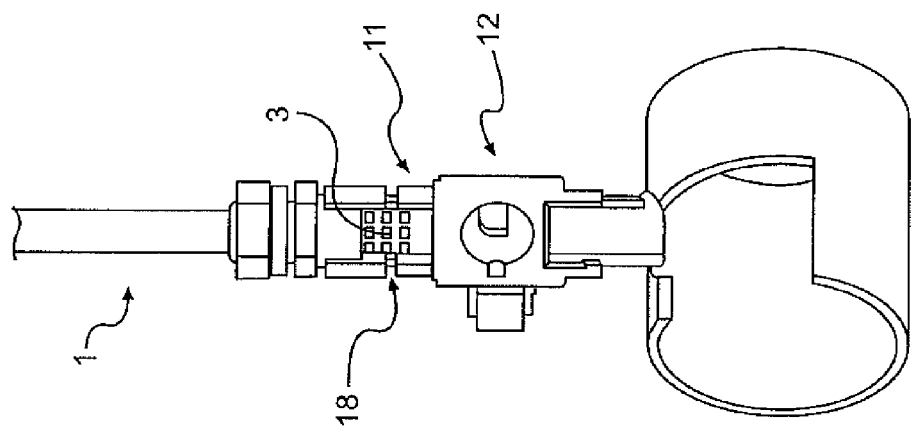
FIG. 6 is a drawing of a measuring and calibration solution used in a typical embodiment of the present invention, FIG. 6a showing the position of the probe during measurement and FIG. 6b showing the position of the probe during calibration.
Figure 6B:
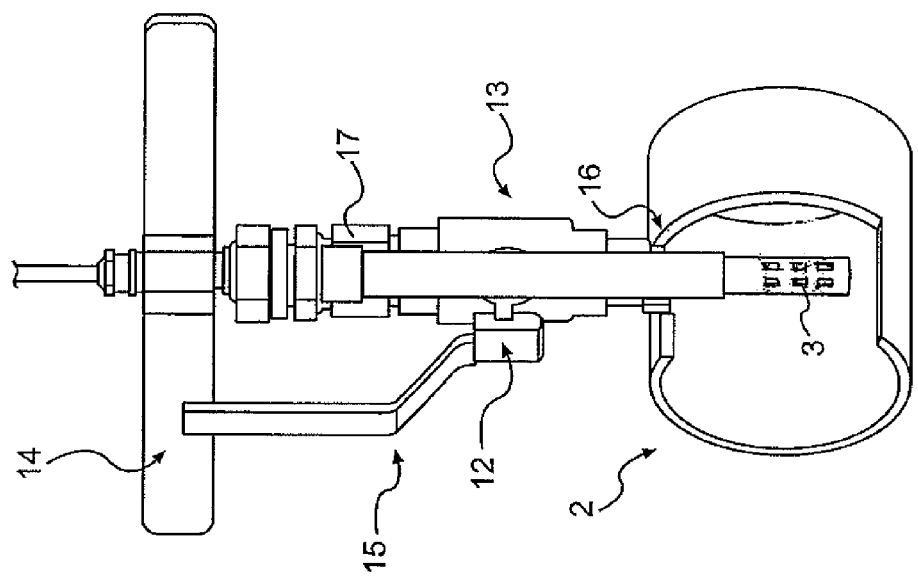

The probe 1 can, for example, be calibrated using the system shown in FIGS. 6a and 6b. These Figures depict solutions where the probe 1 is mounted to the object, such as a liquid container 2, typically a tube, containing the liquid to be measured, which typically is an oil. The calibration container 11 is formed by a ball valve 12 in the mounting construction 13, such that the probe 1 may be calibrated easily whenever needed. The calibration can be performed simply by lifting the probe 1 from a lower position (FIG. 6a) past the ball valve 12 to an upper position (FIG. 6b) using a manual press handle 14. The ball valve 12, in turn, can be operated using a ball valve handle 15. A groove 16 on the head of the sensor 1 indicates the upper adjustment limit of the sensor 1. To make the probe 1 slide easily and to make the mounting construction 13 stable, a clasp nut 17 needs to be tightened. The construction 13 further has a filter 18 mounted on it to protect the sensors 3, 5, 9 from contamination.

The changes in the capacitance of the sensor 3 can be changed into dielectric constants by measuring the capacitances of samples with known dielectric constants, whereby the following correlations are obtained:

$$\in(T\text{const}) = F(\text{Ceps}(T\text{const})) \quad (11)$$

$$\in(T\text{const}, aw=0) = F(\text{Ceps}(T\text{const}, aw=0)) \quad (12)$$

The capacitance can be changed into dielectric constants already before the temperature dependencies are determined or the above calculations concerning the temperature dependencies of the dielectric constants are made using this ∈-data.

Water contents can be calculated when the capacitances ∈(Tconst, aw=0) and ∈(Tconst) are known, whereby the difference between these equals the rise in ∈ caused by water:

$$\in(T\text{const}) - \in(T\text{const}, aw=0) = d\in(\text{water}) \quad (13)$$

and further: $d\in(\text{water})/80*10\exp6 = \text{water content (in ppm)}$ (14)

A correction function may also be determined for the equations of this embodiment, whereby the factors of this function are calculated for each sensor using samples of known water content. This can be performed by factory calibrations or using a field, when the water contents are known for at least one point at a known time.

The calculations of the above embodiments can be used to correct any possible errors occurring during measurements caused by changes in temperature.

The present invention also concerns a device for simultaneously measuring the temperature dependency of a sensor 3 for a variable, the value of which varies with the temperature, for any liquid and gathering the data produced by the sensor 3. The device consists of at least one measuring probe 1 and a liquid container 2 to be mounted on it.

According to one preferable embodiment, the device consists of two probes 1, one of which is used for heating while the other is used for measuring. Both probes 1 are surrounded by the mentioned liquid container 2.

According to another preferable embodiment, the device consists of only one probe 1, which is placed in a container 2. The one probe performs both the heating and the measuring.

After the container 2 has been filled with oil, it is heated to a desired temperature and the measuring points are collected from the cooling curve.

EXAMPLES

Example 1

Measuring Setup 1

Figure 2A:
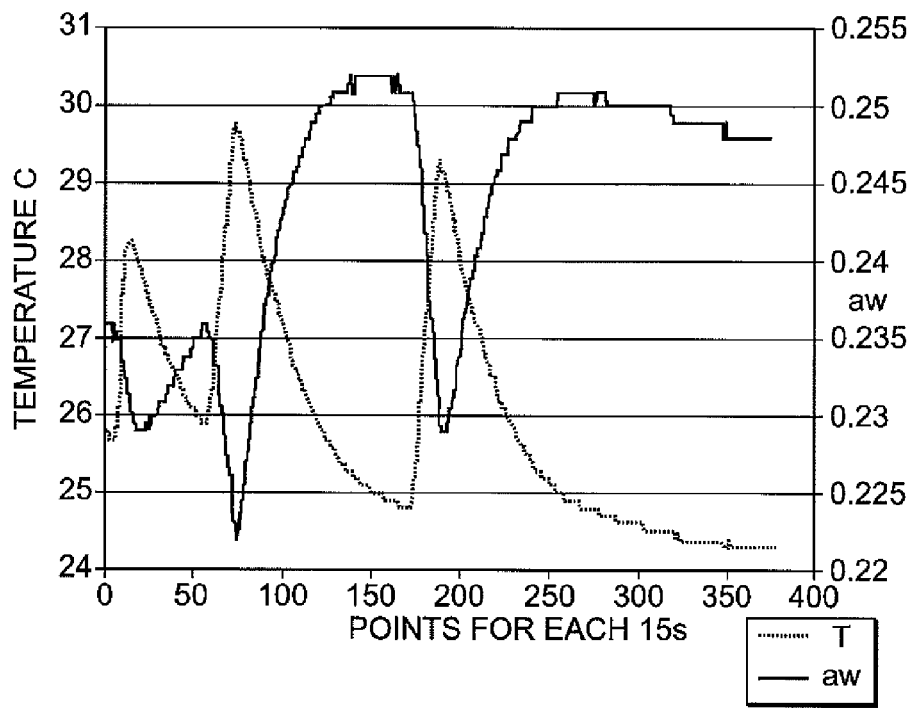
In FIG. 2a the temperature (T) and the relative humidity (aw) are shown as a function of time, while in FIGS. 2b and 2c the measured and calculated relative humidities are shown as functions of the temperature.

In one measuring setup of the invention, two probes are used, one of which is used for heating while the other is used for measuring. The setup is presented in FIG. 1a. FIG. 2a presents the measuring results obtained using the mentioned setup, wherein the temperature and the relative humidity are shown as a function of time.

Example 2

Measuring Setup 2

Figure 2B:
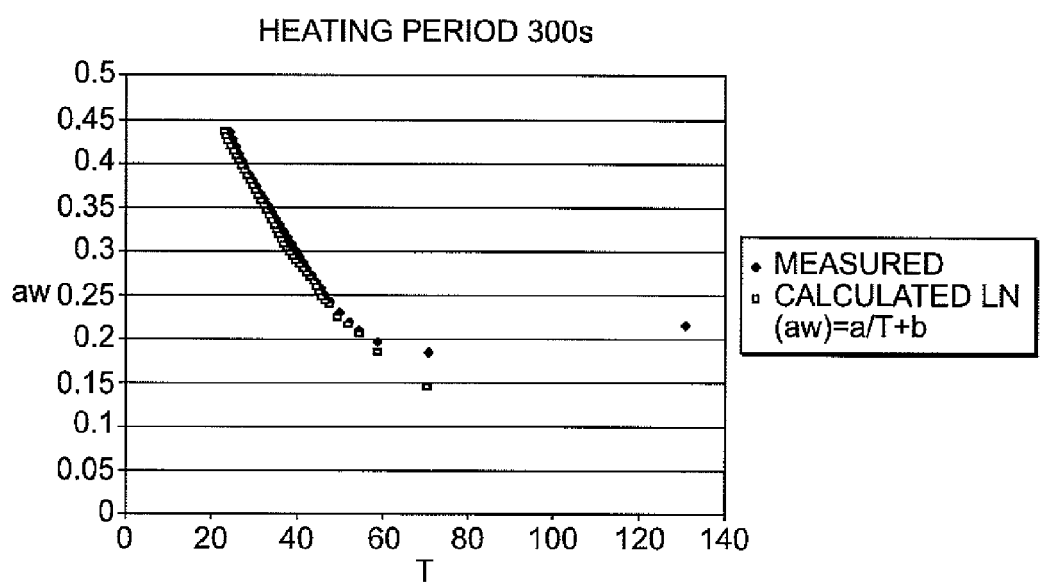
FIG. 2 shows the measuring results obtained using the mentioned setup the graph of FIG. 2a being obtained in measurements using the setup of FIG. 1a and the graphs of FIGS. 2b and 2c being obtained in measurements using the setup of FIG. 1b.
Figure 2C:
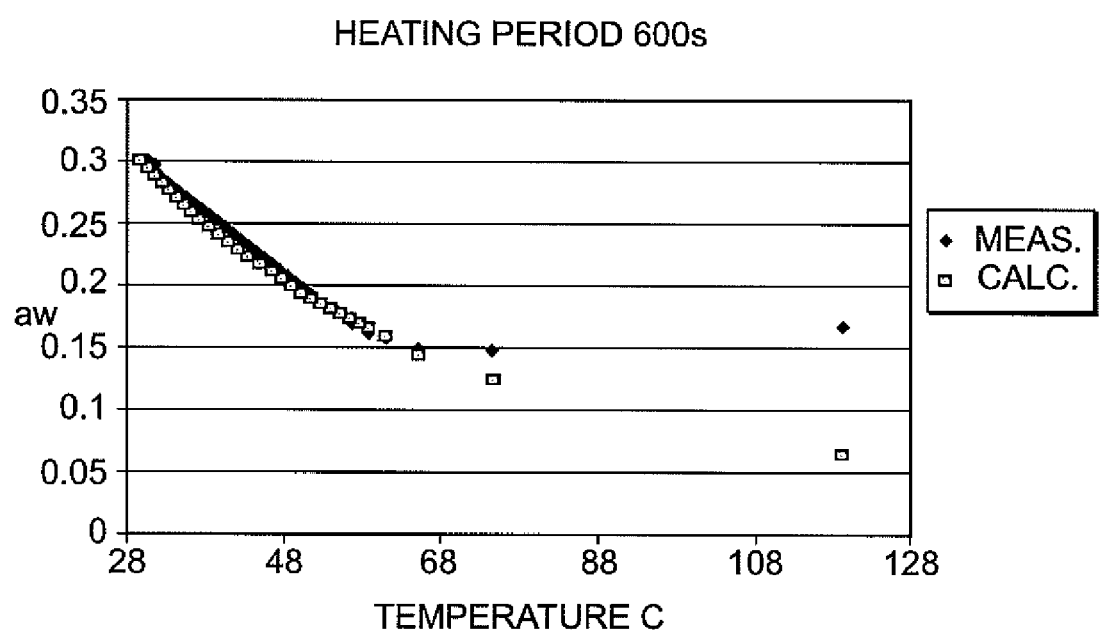

In another measuring setup of the invention, one probe is used, which probe is placed in a container, which is filled with oil, after which the container is heated using pt100 and the measuring points are taken from the cooling curve. The setup is presented in FIG. 1b, while FIGS. 2b and 2c show the measuring results obtained using the mentioned setup, wherein measured and calculated relative humidities as functions of the temperature are compared. In FIG. 2b, a situation wherein the heating has been continued for 300 s is shown, while in FIG. 2c, a situation wherein the heating has been continued for 600 s is shown. The cooling rate in these measurements is about 1.5 degrees/min.

Example 3

Calculating the Water Content of an Unknown Sample

In a case where it is known that aw=0.5 and T=32° C., the water content is 200 ppm. Then, using equation (2), $aw(T^1) = \exp(a/T^1+b)*[aw(T^2)/\exp(a/T^2+b)]$, the following calculations were made for a situation, wherein aw=0.22 and T=72° C.:

$$\exp(a/(32+273.16)+b)*[aw(72)/\exp(a/(72+273,16)+b)] = 0.657$$

and further:

$$0.657/0.5*200\text{ppm} = 262.8\text{ppm}$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for measuring a temperature dependency of a sensor element for a variable, a value of which varies with a temperature, for an oil-like liquid, in which method the temperature of the liquid is changed over time, comprising the following steps:

collecting data produced by the sensor element simultaneously with a changing of the temperature, and thereafter using the data produced by the sensor element at the different temperatures to determine coefficients for compensation algorithms of the temperature dependencies of the sensor element, thus producing a correlation between the change in temperature and the other measured variables, wherein the correlation can be obtained between the changes in a capacitance of the sensor element and a dielectric constant:

$$\in(Tconst)=F(Ceps(Tconst)$$

wherein F depicts a correlation function, $\in$ is capacitance, Ceps is the dielectric constant and Tconst is measured temperature at a given point.

2. The method of claim 1, characterized in that the measured variable is relative humidity.

3. The method of claim 2, characterized in that the following equation is used to describe the temperature dependency of the relative humidity of a liquid:

$$aw=f(T) \quad (1)$$

wherein aw is the relative humidity and T is the temperature.

4. The method of claim 3, characterized in that the following equation is used to describe the temperature dependency of the relative humidity of a liquid:

$$aw=\exp(a/T+b) \quad (2)$$

wherein aw is the relative humidity, T is the temperature and a and b are constants derived from a graph presenting the relative humidity as a function of the temperature, whereby constant a is derived from the slope of the graph, whereas constant b is the value of aw when T=0.

5. The method of claim 2, characterized in that the following equation is used to describe the relative humidity of a liquid at a certain temperature, $T^1$:

$$aw(T^1)=f(T^1)*[aw(T^2)/f(T^2)] \quad (3)$$

wherein aw is the relative humidity, $T_2$ is a given temperature, which is different from $T_1$ and for which the value for the relative humidity is known.

6. The method of claim 5, characterized in that the following equation is used to describe the relative humidity of a liquid at a certain temperature, $T^1$:

$$aw(T^1)=\exp(a/T^1+b)*[aw(T^2)/\exp(a/T^2+b)] \quad (4)$$

wherein aw is the relative humidity, $T^2$ is a given temperature, which is different from $T^1$ and for which the value for the relative humidity is known, and a and b are constants derived from a graph presenting the relative humidity as a function of the temperature, whereby constant a is derived from the slope of the graph, whereas constant b is the value of aw when T=0, which equation only depends on the water content of the liquid.

7. The method of claim 5, characterized in that the following equation is used in the sensor measurements to describe the dielectric constant of the liquid:

$$Ceps(Tconst,aw=0)=f(Tconst) \quad (9)$$

wherein aw is the relative humidity, Ceps is the dielectric constant and Tconst is the measured temperature at a given point.

8. The method of claim 5, characterized in that the following equation is used in the sensor measurements to describe the dielectric constant of the liquid:

$$Ceps(Tconst,aw=0)=Ceps(Tconst)-a*aw(Tconst) \quad (10)$$

wherein aw is the relative humidity, Ceps is the dielectric constant, Tconst is the measured temperature at a given point and constant a is a proportionality factor derived from the slope of a graph presenting the dielectric constant as a function of the temperature.

9. The method of claim 1, characterized in that a field calibration method is applied for triple sensor measurements of the oil-like liquid.

10. The method of claim 9, characterized in that three measured variables in the triple sensor measurement are relative humidity, the dielectric constant and the temperature.

11. The method of claim 1, characterized in that the following equation is used to describe the temperature dependency of the dielectric constant of the liquid:

$$Ceps=f(T) \quad (b\,5)$$

wherein Ceps is the dielectric constant and T is the temperature.

12. The method of claim 11, characterized in that the following equation is used to describe the temperature dependency of the dielectric constant of the liquid:

$$Ceps=a*T+Ceps_0 \quad (6)$$

wherein Ceps is the dielectric constant, T is the temperature, $Ceps_0$ is the value for the dielectric constant at T=0 and a is a constant derived from the slope of a graph presenting the dielectric constant as a function of the temperature.

13. The method of claim 1, characterized in that heating or cooling that causes the change in temperature can be performed using a temperature measurement resistor or the heating/cooling can be done using a separate heating/cooling element.

14. The method of claim 13, characterized in that the separate heating/cooling element is mounted onto the measuring probe or into the casing of the container of the liquid.

15. The method of claim 1, characterized in that the sensors of the measured variables, the liquid surrounding them and the temperature sensor are substantially at the same temperature when the measuring points are chosen.

16. Use of the method of claim 1, for compensation of errors in measurements caused by changes in the temperature.

17. The method of claim 1, characterized in that the following correlation can be obtained between the changes in the capacitance of the sensor element and the dielectric constant:

$$\in(Tconst,aw=0)=F(Ceps(Tconst,aw=0)) \quad (12)$$

wherein F depicts a correlation function, $\in$ is the capacitance, Ceps is the dielectric constant, aw is the relative humidity and Tconst is the measured temperature at a given point.

18. The method of claim 1, characterized in that water contents can be calculated when the capacitances $\in(Tconst, aw=0)$ and $\in(Tconst)$ are known, whereby the difference between these equals the rise in $\in$ caused by water:

$$\in(Tconst)-\in(Tconst,aw=0)=d\in(water) \quad (13)$$

and further: $F(d\in/(water))=$ water content $\quad (14)$

19. A device for simultaneously measuring a temperature dependency of a sensor for a variable, the value of which varies with the temperature, for an oil-like liquid and gathering data produced by the sensor, which device comprises;

a sensor (3) for a measuring a variable, and a liquid container (2) for containing the oil-like liquid, means for changing the temperature (4) of the oil-like liquid in the container, a temperature sensor (5) for measuring the temperature of the oil-like liquid, means for collecting data (6) produced by the sensor simultaneously with a changing of the temperature, and means for calculating necessary calibration coefficients (7), wherein data is produced by the sensor at the different temperatures to determine coefficients for compensation algorithms of the temperature dependencies of the sensor element, thus producing a correlation between the change in temperature and the other measured variables, wherein the correlation can be obtained between the changes in a capacitance of the sensor element and a dielectric constant:

$$\in(T\text{const}) = F(C\text{eps}(T\text{const}))$$

wherein F depicts a correlation function, $\in$ is capacitance, Ceps is the dielectric constant and Tconst is measured temperature at a given point.

20. The device of claim 19, characterized in that it consists of at least one probe (1) and a liquid container (2) to be mounted on it.

21. The device of claim 19, characterized in that it consists of two probes (1), one of which is used for heating while the other is used for measuring, onto which probes (1) the liquid container (2) is mounted.

22. The device of claim 19, characterized in that it consists of one probe (1), which is placed in the liquid container (2), which is filled with oil, after which the container (2) is heated and the measuring points are collected from the cooling curve.

* * * * *